United States Patent
Richburg

[11] Patent Number: 5,067,926
[45] Date of Patent: Nov. 26, 1991

[54] CYLINDRICAL SIEVE FOR MEAT DEBONING APPARATUS AND METHOD

[76] Inventor: James B. Richburg, 101 Pumpkin La., Sumter, S.C. 29150

[21] Appl. No.: 504,856

[22] Filed: Apr. 5, 1990

[51] Int. Cl.$^5$ .............................................. A22C 5/00
[52] U.S. Cl. ...................................... 452/135; 452/94; 452/139; 241/74
[58] Field of Search ......................... 17/16, 21, 46, 50; 241/74; 209/392, 393, 395, 931; 452/135, 138, 139, 94

[56] References Cited

U.S. PATENT DOCUMENTS

| | | | |
|---|---|---|---|
| 3,648,843 | 3/1972 | Pearson | 210/443 |
| 4,042,176 | 8/1977 | Beck et al. | 241/74 |
| 4,069,980 | 1/1978 | Yarem et al. | 241/74 |
| 4,340,184 | 7/1982 | Poss | 241/82.3 |
| 4,546,927 | 10/1985 | Bloome et al. | 241/74 |
| 4,566,640 | 1/1986 | McFarland | 241/74 |
| 4,685,626 | 8/1987 | Kerdiles et al. | 241/74 |
| 4,742,966 | 5/1988 | Szkaradek et al. | 241/69 |
| 4,824,027 | 4/1989 | Shaw et al. | 241/24 |

FOREIGN PATENT DOCUMENTS 336747 1/1920 Fed. Rep. of Germany ...... 209/393

Primary Examiner—James G. Smith
Assistant Examiner—Lawrence Cruz
Attorney, Agent, or Firm—Cort Flint

[57] ABSTRACT

A meat deboning sieve (A) is disclosed which includes a plurality of sieve plates (10, 10') stacked together in a sieve assembly (15). Radial grooves (B) in the sieve plates are machined along a radial center line of the assembly to define radially aligned slots (D,D') in sieve (A) when stacked and compressed together in a unitized construction. A bonding agent (62) bonds mating surfaces (64) together to eliminate any voids and accumulation of bacteria. A hardness coating (48) reduces friction reducing the temperature of the meat product and energy consumed.

27 Claims, 2 Drawing Sheets

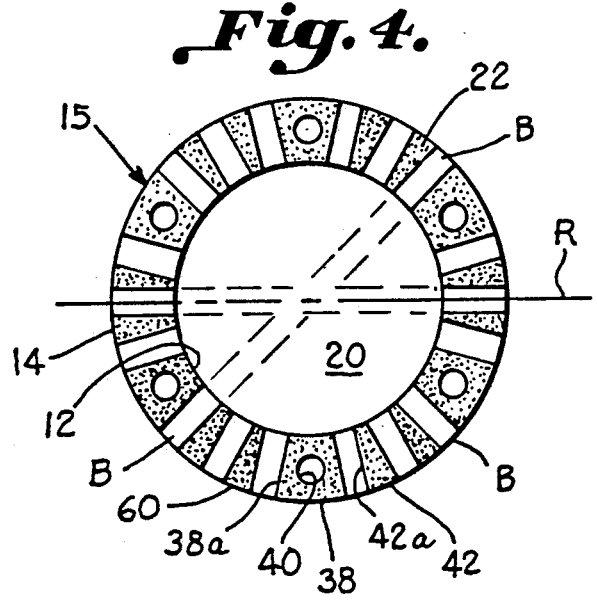
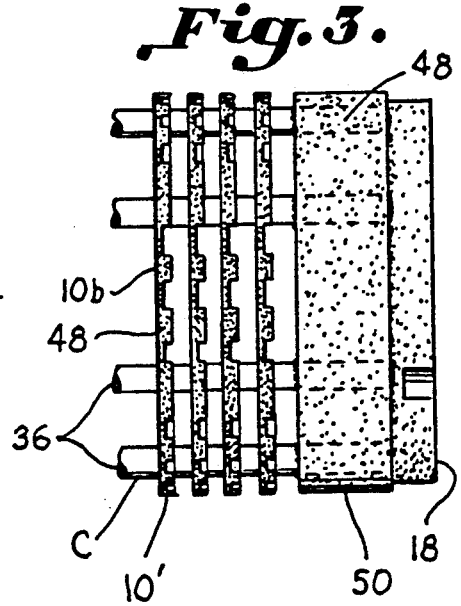
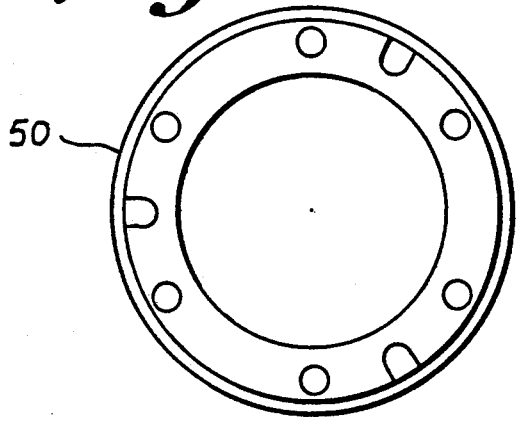
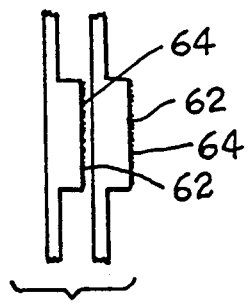
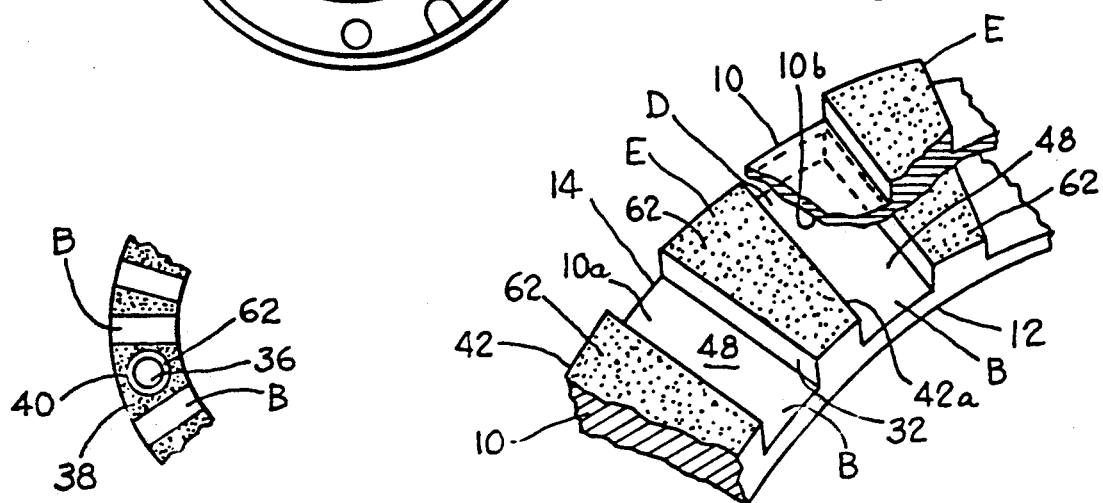

CYLINDRICAL SIEVE FOR MEAT DEBONING APPARATUS AND METHOD

BACKGROUND OF THE INVENTION

The invention relates to a meat deboning sieve for use in a mechanical apparatus and process for deboning the meat portion of poultry, fowl and the like by forcing a meat and bone material through a pressure housing with gradually increasing force so that the meat is separated by the sieve while the bony material exits an end of the sieve.

Prior deboning apparatus and methods, for example, as shown in U.S. Pat. No. 4,042,176, cause a separation of bony material from the meat of poultry and the like. An auger forces the material through a pressure housing where the meat is forced outwardly through a perforated screen and the bony material is forced axially through the pressure housing where it exits. The apparatus and method of this type have a high temperature rise in the pressure housing due to high pressures and relatively high friction losses as the product passes through the perforated screen. The meat product remains inside the pressure housing for a long time at high pressures. This causes seals in the infeed area to regularly leak. Due to the small hole area of the perforations in the screen, typically the size of a 0.5 mm pencil lead drilled in the screen, the fiber length of the meat product passing through the screen is reduced. The high temperature rise and high pressure in the pressure housing produce a relatively high bone count and fat content, in addition to a reduced shelf life of the meat product. The perforated screen has a relatively short life.

U.S. Pat. Nos. 4,685,626 and 4,340,184 disclose other forms of separator screens for use in meat deboning apparatus and method employing "slotted" screens. The first patent ('626) discloses a separation grill forming a sieve which includes a spiral spring having wedges disposed between adjacent windings to from spiral slots through which meat may be separated under pressure. The second patent ('184) discloses a separator screen which includes a stack of plain annular discs alternating with configured annular discs which are clamped tightly face to face. The configured discs include a reduced web surrounding spacer portions. When the discs are clamped together, slots are defined between the plain discs and the reduced webs of the configured discs through which the meat passes for separation during pressurization. The slots are not regularly defined in a manner in which a continuous passage of meat is provided through the ring without a change in direction. However, the assembly of many rings held in position by a cage results in internal voids being formed which can harbor bacteria. Because of these voids, the screens must be disassembled regularly for cleaning. Not only do these type of screens have to be disassembled for cleaning on a regular basis, but they must be sharpened regularly while they are disassembled, due to the relative soft nature of the metal used. This creates metal filings and burrs caused by the soft stainless steel with poor edging qualities used in its construction. The slotted screen constructions also have been found to allow excessive bone count, particularly at high speed operation. Because the slots are not machined at angles, the material must change direction as it leaves the slot, increasing turbulence and temperature rise.

Accordingly, an object of the invention is to provide a sieve for a meat deboning apparatus and method which provides increased production of meat product.

Another object of the invention is to provide a sealed one-piece construction for a meat deboning sieve for a mechanical deboning apparatus and method which produces a meat product with lower bone and fat content at higher production rates.

Another object of the invention is to provide a sieve for deboning meat having a unitized construction which eliminates voids which harbor bacteria and does not require cleaning or sharpening on a regular basis, and does not require disassembly.

Another object of the present invention is to provide a cylindrical sieve for deboning meat which includes slots that extend radially from a center of the sieve to facilitate separation of the meat without significant change in direction through the sieve.

Another object of the invention is to provide a deboned meat product with longer fibers.

Another object of the invention is to provide a meat deboning sieve which operates at a lower pressure and produces a lower temperature rise in the meat product.

Another object of the invention is to provide a cylindrical meat deboning sieve which reduces the bone count and fat content in the meat product at a bone exit end of the sieve.

SUMMARY OF THE INVENTION

The above objectives are accomplished according to the present invention by constructing a cylindrical meat deboning sieve from surgical, heat treatable, stainless steel which is hardened. Rectangular openings are formed radially through the sieve which extend radially along a center line of the sieve and have straight sides to avoid accumulation of processed meat product while in operation. The radially aligned slots with straight sides facilitates easy and thorough cleaning so as to avoid a build-up of bacteria. A slot-length may be selected to accommodate specific motor speeds, for example, in a range of from 900 rpm to 1800 rpm, with the shorter slots being used at higher rpms. The radially aligned slots take maximum advantage of available centripetal force while allowing meat product to pass through them at a low head pressure inside the sieve and low power consumption. This results in longer fibers in the meat product which provides a longer shelf life for the meat product, and minimum energy to be transferred to the meat product in the form of heat. This is due to the improved sheering action which comes as a result of the longer slot length and greater area per slot opening when compared to perforated screens, and improved edge retention of the slots obtained by heat treating the metal, requiring less sharpening. As a result of lower temperature rise in the meat product, reduced cooling time and cost is provided. The separation of meat product from its bone without passing of bone fragments is accomplished by using very narrow slot openings in comparison to other slotted screens which suffer from high bone counts due to their longer, wider openings.

With the construction so described, the deboning apparatus and method may be operated at higher speeds which require less time in compression and lower compression for the meat product resulting in lower temperature rise. The slots are radially aligned so no material is blocked by the sides of the slot and no significant change in direction is needed for material to exit the screen which further promotes reduced temperature rise in the product. Because of the sealed one-piece construction, there are no voids to harbor bacteria. The hardened surfaces greatly reduce friction and wear resulting in less metal infiltration into the product and lower temperature in the meat product. The exit end of the sieve wears faster than the rest of the sieve because it is exposed to the relatively bare processed bone when it is under its fullest compression at the exit end of the auger inside the sieve. The one-piece construction allows the cylindrical sieve to be reversed to distribute wear to either end. Because there is very little meat on the bone and because the bone is fragmented at the exit end, the slots at the exit end of the sieve are made smaller than those of the middle of the sieve to prevent passage of bone product. This results in a lower bone count. Lower pressures in the sieve result in lower temperature rise in the meat product still in the auger, which in turn, causes less fat to melt in the meat product retained on the bone. Chicken, for example, is 81 percent flesh and 19 percent bone. When it is processed, only 68 to 72 percent of the chicken is recovered as product. This means that 9 to 13 percent meat product remains attached to the bone which exits the machine at a temperature high enough to melt the fat and sling it out the screen. This can add fat to the deboned meat product.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 3 is a side elevation of a meat deboning sieve constructed in accordance with the invention with parts separated;

FIG. 4 is a front elevation of a sieve plate having radially aligned grooves for a meat deboning sieve constructed in accordance with the invention;

FIG. 5 is a front elevation of an end cap of a meat deboning sieve constructed according to the invention;

FIG. 6 is a partial side elevation of two juxtaposed sieve plates with a bonding agent disposed between the plates according to the invention; and FIG. 7 is a perspective view of two juxtaposed sieve plates with a bonding agent disposed between the plates according to the invention.

FIG. 8 is a partial sectional view illustrating an alignment rod extending through an opening in a land of a sieve ring according to the invention wherein a space between the rod and ring hole is filled with a bonding agent.

DESCRIPTION OF A PREFERRED EMBODIMENT

Referring now in more detail to the drawings, a meat deboning sieve, designated generally as A, is illustrated which provides a high meat output with a low bone content for use with deboning apparatus.

Figure 1:
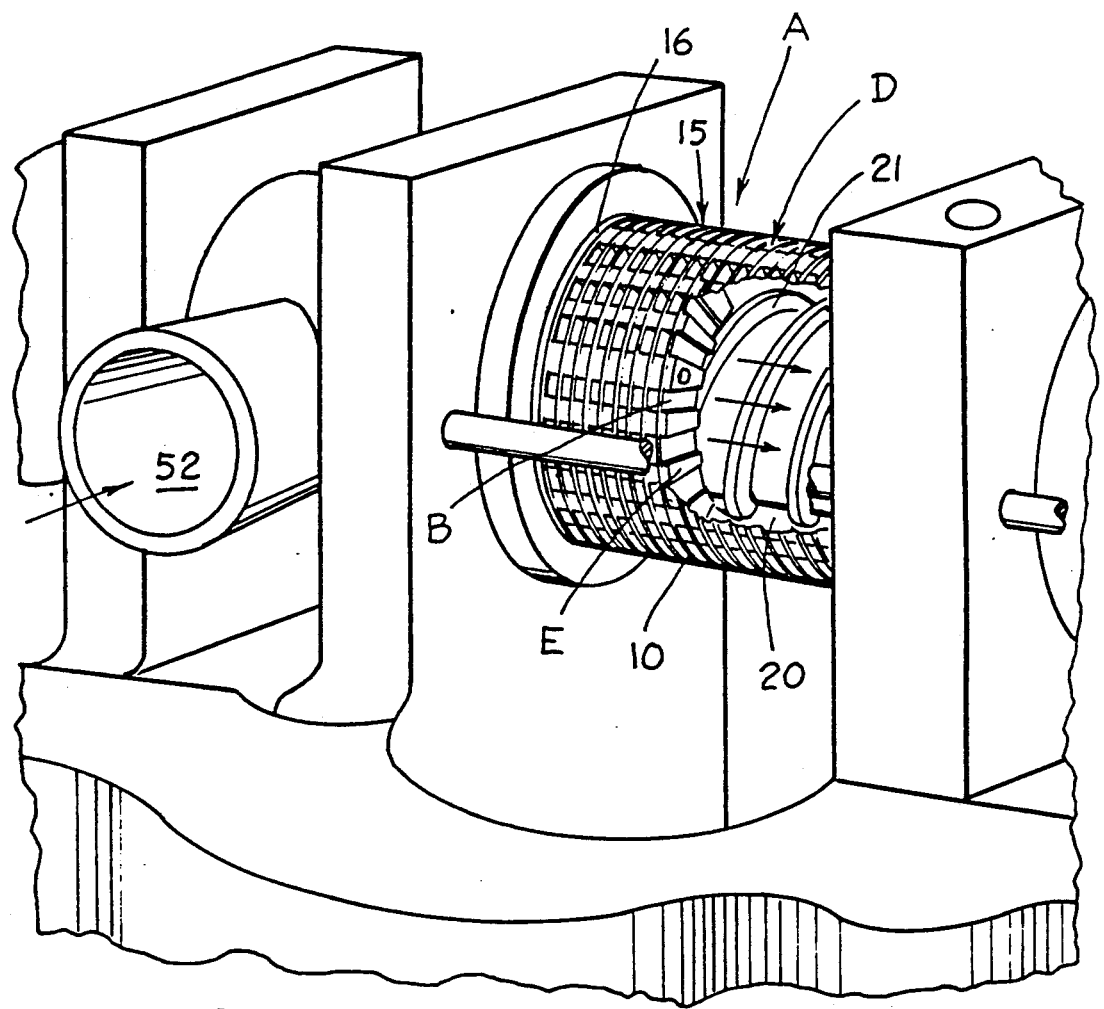
FIG. 1 is a partial perspective view of a mechanical deboning apparatus and method having a meat deboning sieve constructed in accordance with the present invention with part cut away.
Figure 2:
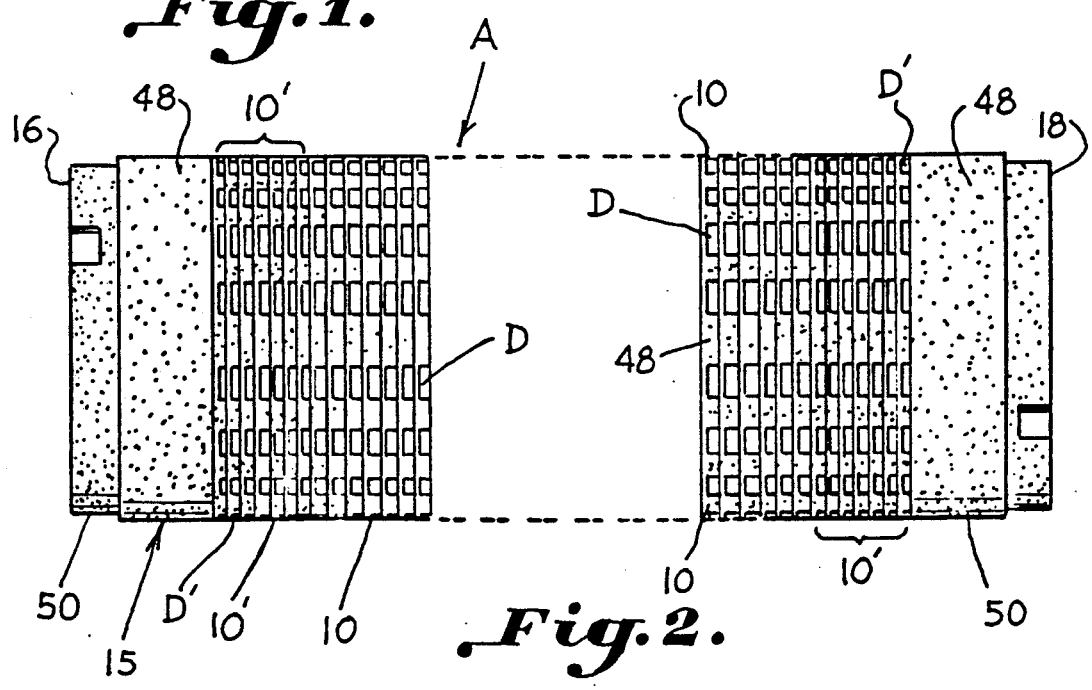
FIG. 2 is a side elevation of a meat deboning sieve according to the invention.

As can best be seen in FIGS. 1 and 2, sieve A includes a plurality of stacked sieve rings 10, machined from surgical, heat treatable stainless steel which is hardened. A suitable hardened stainless steel is available from Crucible Steel of Charlotte, N.C. under the designation 416 or 420 Plus X. Sieve A has an inside diameter 12 and an outside diameter 14. A plurality of radially aligned grooves B defined by a plurality of lands are circumferentially spaced around the sieve rings. Grooves B are machined radially along a radial center line R of the sieve. Alignment means C is provided for stacking the sieve rings together in a juxtaposed manner to form a sieve assembly, designated generally as 15, with an entrance end 16, an exit end 18, and a pressure chamber 20 defined within an interior of the sieve assembly. A plurality of radially aligned slots D are defined by radial grooves B between stacked sieve rings 10. As meat and bone are conveyed by auger 21 toward exit end 18, meat is separated by centripetal force and outward pressure from the auger through radially aligned slots D while bone material is conveyed through exit end 18. Auger 21 is driven by suitable means, and the above referenced patents may be referred to for more detail.

Radial slots D extend continuously through the sieve from pressure chamber 20 to an exterior 22 of sieve A. As can best be seen in FIGS. 4 and 7 a plurality of radially extending grooves B are equiangularly spaced around the circumference of the sieve rings. Radially aligned slots D have a rectangular cross-section defined by a length and width, and radial slots D' near exit end 18 of the sieve assembly have a smaller cross-sectional area than the radial slots in a medial portion of the sieve assembly. For example, slot D may have a width of 0.014 inches and slots D' a width of 0.010 inches. Slots D,D' may have a length of 0.375 inches. Narrow slots D' cover about 1.25 inches at the exit and entrance end. Radially aligned slots at the entrance end of the sieve assembly may also include a narrower width so that the sieve assembly may be reversed axially in use. The parallel sided grooves nave center lines "R" which extend radially of the sieve rings. Sieve rings 10 include a plurality of circumferentially spaced lands E which have opposite, generally parallel walls 32 which define radially extending grooves B between adjacent spaced lands. All grooves B are radially centered and aligned (FIG. 4). Lands E abut adjacent stacked sieve rings to define radial slots D. The lands are formed on a first side 10a of the sieve rings, and abut a second side 10b of an adjacent sieve ring. Second side 10b of sieve rings 10 includes a smooth, continuous planar surface. Lands E extend from inside diameter 12 to outside diameter 14 of the sieve rings. Alignment means C includes a plurality of elongated elements 36 extending through sieve rings 10. Lands E include a plurality of major lands 38 having openings 40 which receive the elongated elements, and a plurality of minor lands 42 which are circumferentially spaced between the major lands. The major and minor lands have generally divergent side edges 38a, 42a which are machined in a radial direction along a radial center or the sieve to define radial grooves B. The radial grooves have generally parallel resultant side walls 32.

Sieve assembly A is coated with a hardness coating 48 which has a Rockwell hardness of at least 72 on the C scale to reduce friction and temperature rise in the meat product passing through the sieve. Any suitable hardness coating may be utilized such as a USDA approved chrome coating sold under the designation Armoloy by High Tech Plating of Seneca, S.C. The coating coats the entire sieve including radial slots D, D'. An end cap 50 is carried at each end of the sieve assembly, which receive rod elements 36 to interconnect the end rings and assist in clamping the stacked rings together. The end caps may be made integral with the rod elements by any suitable means such as welding. Meat and bony material enter the pressure chamber at entrance 52. Meat is forced through radial slots D,D' as the material is forced forward and outward by tapered auger 21. Bony material leaves the sieve through exit end 18 in a conventional manner, for example, as described in U.S. Pat. No. 4,042,176. Radial slots D' near exit end 18 of the sieve assembly have a narrower cross-section than those in a medial portion or entrance of the sieve assembly to prevent passage of the bony material at the exit end. Radial slots D, D' have rectangle openings on inside diameter 12 of the sieve and have straight, generally parallel walls 32 from inside diameter 12 to outside diameter 14 of the sieve assembly.

As can best be seen in FIGS. 6 and 7, the meat deboning sieve has a unitary construction provided by a medium temperature, sanitary bonding agent 62, which may be either a mechanical bonding agent or a chemical bonding agent, disposed between each adjacent sieve ring 10 which fills any voids in all the mating surfaces of the stacked rings, e.g. 64, to prevent the accumulation of bacteria and provide mechanical rigidity. A suitable mechanical bonding agent is silver solder or silver brazing. A suitable chemical bonding agent is Loctite available from the Loctite Corporation. Means for clamping the stacked sieve rings in the sieve assembly together in compression with the bonding agent disposed between adjacent rings include rod elements 36 and end caps 50 welded together under compression.

A method of constructing a meat deboning sieve for deboning apparatus includes stacking a plurality of sieve rings 10 together having outwardly extending grooves B to form a cylindrical sieve assembly having a plurality of sieve slots D,D'. Adjacent ones of the stacked sieve rings are bonded together to fill in any voids in the mating surfaces of the sieve rings. The stacked sieve rings are compressed in alignment, and mechanically clamped together in the cylindrical sieve assembly while the sieve assembly is under compression. The sieve assembly is cooled and the compression is released after clamping the stacked sieve rings together to provide a tensile strength of at least about 50,000 pounds due to the mechanical clamping and bonding. The assembly steps of the method includes (1) aligning and stacking the sieve rings and end caps and coating the rings on one end cap and rods and coating the rings, end caps, and rods with the bonding agent; (2) adding the second end cap; (3) compressing the assembly of rings, end caps, and alignment rods; (4) welding the end caps and rods; (5) releasing compression; (6) removing excess bonding agent; (7) soldering the assembly in an oven which is air quenched; and (8) cooling the assembly. Preferably, grooves B are radially formed in the sieve rings so that a plurality of radially extending slots D, D' are circumferentially spaced between adjacent rings in the sieve assembly. Interior diameter 12 of the sieve assembly is honed and the outside diameter of the sieve assembly is ground to reduce surface imperfections which may harbor bacteria. Finally, the sieve assembly is coated with hardness coating 60 to reduce friction and temperature rise in the meat product passing through the sieve.

Thus, it can be seen that an advantageous construction can be had for a deboning sieve and method according to the invention which provides increased meat production, efficiency, and reduced bone content. In one example, it was found that a production rate of 9230 pounds of finished meat product per hour at 55 horse power was achieved using a deboning sieve according to the invention. The temperature rise was about 6 degrees Fahrenheit. In comparison, a conventional perforated screen having drilled holes was found to produce 7920 pounds of finished meat product per hour at 89.5 horse power. On an energy per pound basis, the present invention was found to be 47 percent more efficient. The temperature rise was about 15 degrees Fahrenheit.

While a preferred embodiment of the invention has been described using specific terms, such description is for illustrative purposes only, and it is to be understood that changes and variations may be made without departing from the spirit or scope of the following claims.

I claim:

1. A unitary meat deboning sieve which provides a high meat output with low bone content comprising:
   a plurality of stacked sieve rings having an inside diameter and an outside diameter;
   each said sieve ring consisting of a plurality of radially aligned grooves defined by a plurality of lands circumferentially spaced around said sieve rings;
   said grooves being defined by lands having generally divergent side edges extending parallel to a radial of said sieve rings, and said generally divergent side edges of said sieve rings defined radially aligned grooves having opposing sidewalls which are generally parallel to each other;
   alignment means for stacking said sieve rings together in a juxtaposed manner to form a sieve assembly with an entrance end and an exit end;
   a pressure chamber defined within an interior of said sieve assembly;
   a plurality of radially aligned slots defined by said radial aligned grooves between said stacked sieve rings, said radial slots being generally unobstructed and extending through said sieve from said pressure chamber to an exterior of said sieve; and
   means for clamping said stacked rings together in a unitized sealed construction.

2. The apparatus of claim 1 wherein a plurality of said radially extending equiangularly separated grooves are equiangularly spaced around the circumference of said sieve rings.

3. The apparatus of claim 1 wherein said radial slots have a rectangular cross-section defined by a length and width, and said radial slots near said exit end of said sieve assembly have a narrower width than the radial slots in a medial portion of said sieve assembly.

4. The apparatus of claim 3 wherein said radial slots at said entrance end of said sieve assembly include said narrower width so that said sieve assembly may be reversed axially in use.

5. The apparatus of claim 1 wherein said radial grooves have center lines which extend radially of said sieve rings, said lands have generally radial walls which define said radial grooves between adjacent ones of said spaced lands, and said lands abutting adjacent stacked sieve rings to define said radial slots.

6. The apparatus of claim 5 wherein said lands are formed on a first side of said sieve ring, and abut a second side of an adjacent sieve ring.

7. The apparatus of claim 6 wherein said second side of said sieve ring includes a smooth continuous planar surface.

8. The apparatus of claim 5 wherein said lands extend from said inside diameter to said outside diameter of said sieve rings.

9. The apparatus of claim 1 wherein said lands extend from said inside diameter to said outside diameter of said sieve rings.

10. The apparatus of claim 1 wherein said alignment means includes a plurality of elongated elements extending through said sieve rings, said lands including a plurality of major lands having openings which receive said elongated elements, and a plurality of minor lands which are circumferentially spaced between said major lands.

11. The apparatus of claim 10 wherein said major and minor lands have generally divergent side edges which are machined, and said radial grooves have generally parallel resultant side walls.

12. The apparatus of claim 1 wherein said stacked sieve rings are coated with a hardness coating to reduce friction and temperature rise in the meat product passing through said sieve.

13. The apparatus of claim 1 including an end ring carried at each end of said sieve assembly, and means interconnecting said end rings to assist in clamping said stacked rings together.

14. The apparatus of claim 1 wherein said sieve assembly has an entrance end at which meat and bony material enter said pressure chamber, an exit end opposite said entrance end, and a number of said radial slots near said exit end of said sieve assembly having a narrower cross-section than those in a medial portion of said sieve assembly to prevent passage of said bony material at said exit end.

15. The apparatus of claim 1 wherein said radial slots are machined along a radial centerline of said sieve rings and have rectangle openings on an inside diameter of said sieve assembly, and said radial slots have straight walls from said inside diameter to an outside diameter of said sieve assembly.

16. The apparatus of claim 1 wherein said radial slots have a generally rectangular cross-section defined by a length and width wherein said rectangular cross-section is generally uniform from said pressure chamber to said exterior of said sieve.

17. A one-piece meat deboning sieve having a unitary construction comprising:
- a plurality of stacked sieve rings having an inside diameter and an outside diameter and planar side surfaces;
- a plurality of outwardly extending grooves circumferentially spaced around said sieve rings;
- internally sealed alignment means including a plurality of elongated rods extending through openings in said stacked sieve rings for stacking said sieve rings together in a juxtaposed manner to form a sieve assembly with an entrance end and an exit end and for sealing any spaces in said openings between said elongated rods and said stacked sieve rings;
- a bonding agent disposed between each adjacent ring which fills any voids generally in the entire planar mating surfaces of said sieve rings to reduce the accumulation of bacteria and provide mechanical rigidity; and
- means for clamping said stacked sieve rings in said sieve assembly together in compression with said bonding agent disposed between adjacent rings to provide a unitary construction.

18. The apparatus of claim 17 including an end cap at each end of said sieve between which said sieve rings are stacked, elongated alignment means extending through said sieve rings and end caps, and said bonding agent filling substantially all the voids between said mating surfaces of said sieve rings, end caps, and elongated elements.

19. The apparatus of claim 18 wherein said radial slots have a smaller cross-sectional area near said exit end of said sieve assembly than at a medial portion.

20. The apparatus of claim 19 wherein said radial slots near said entrance end include said smaller cross-sectional area so that said sieve is reversible in longitudinal position.

21. The apparatus of claim 17 wherein said outwardly extending grooves are formed along radially extending center lines of said sieve rings to define radial slots extending radially from said inside to said outside diameter of said sieve rings between adjacent sieve rings in said sieve assembly for the passage of said meat product.

22. The apparatus of claim 17 wherein said sieve rings are formed from heat treated stainless steel having increased resistant to edge wear.

23. The apparatus of claim 17 wherein said sieve assembly is coated with a hardness coating to reduce friction and temperature rise in the meat product passing through said sieve.

24. The apparatus of claim 23 wherein said hardness coating has a Rockwell hardness of at least about 72 on the C scale.

25. The apparatus of claim 17 wherein said bonding agent is a medium temperature sanitary bonding agent.

26. The apparatus of claim 17 wherein said bonding agent includes mechanical bonding agent.

27. The apparatus of claim 17 wherein said bonding agent includes a chemical bonding agent.

* * * * *